United States Patent Office 3,513,239
Patented May 19, 1970

3,513,239
PHARMACEUTICAL COMPOSITIONS CONTAINING 2-AMINOALKYL COUMARAN DERIVATIVES AND METHODS OF TREATING DEPRESSION THEREWITH
George Lawrence Willey, Harpenden, and Anthony Maitland Roe, Hatfield, England, assignors to Smith Kline & French Laboratories, Philadelphia, Pa., a corporation of Pennsylvania
No Drawing. Filed Mar. 15, 1967, Ser. No. 623,235
Int. Cl. A61k 27/00
U.S. Cl. 424—285        9 Claims

ABSTRACT OF THE DISCLOSURE

Dosage unit pharmaceutical composition and methods for producing antidepressant activity in depressed or potentially depressed subjects. The active chemical ingredients are 2-aminoalkylcoumarans some of which are known to the art. The active ingredients are prepared by reaction of an amine with a 2-halomethylcoumaran or by N-alkylation of a 2-aminoalkylcoumaran.

---

This invention relates to pharmaceutical compositions having antidepressant activity and methods of inducing antidepressant activity in animals. More specifically the chemical compounds which are the basis of the antidepressant compositions and methods of this invention are 2-aminoalkylcoumarans (i.e. 2,3-dihydrobenzofurans) for which no antidepressant activity has ever been described in the prior art to our knowledge.

The active ingredients are represented by the following general formula:

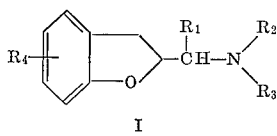

I in which $R_1$ is hydrogen or lower alkyl preferably methyl; $R_2$ and $R_3$ are each hydrogen or loweralkyl or taken together may form a 5 to 6 membered basic heterocyclic ring such as piperidyl, pyrrolidinyl, N-hydroxyethylpiperazinyl, N-loweralkylpiperazinyl or morpholinyl; and $R_4$ is hydrogen, lower alkyl, lower alkyloxy, halo such as chloro, bromo or iodo or trifluoromethyl.

The compounds in which $R_1$ is methyl have particularly pronounced antidepressant activity.

The terms "lower alkyl group" and "lower alkoxy group" are used herein as meaning respectively an alkyl or alkoxy group containing from 1 to 3 carbon atoms.

The compounds of Formula I may be prepared by various suitable methods which will be readily apparent to those skilled in the art. For example, when $R_1$ is hydrogen, a known 2-bromomethylcoumaran derivatives of the general formula:

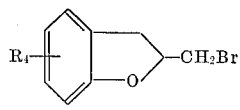

II wherein $R_4$ has the same meaning as in Formula I, can be reacted with an appropriate amine of the formula:

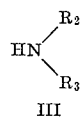

III wherein $R_2$ and $R_3$ have the same meanings as in Formula I, to form the required coumaran derivative of Formula I, the reaction preferably being carried out in an inert organic solvent, for example ethanol. When $R_1$ is a lower alkyl group the compounds of Formula I may best be prepared by reduction of an oxime of the general formula:

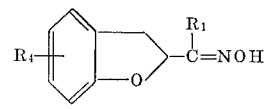

IV wherein $R_1$ is lower alkyl and $R_4$ has the same meaning as in Formula I, with a reducing agent such as lithium aluminum hydride, to give the coumaran derivatives in which $R_2$ and $R_3$ are both hydrogen which can in turn be converted to the comounds in which one or both of $R_2$ and $R_3$ are lower alkyl groups by conventional alkylation procedures, for example the dimethyl compounds can be prepared by methylation with formaldehyde and formic acid. Alternatively the monomethyl compounds can be prepared by reacting the corresponding 2-acetylcoumaran with formic acid and formamide and reducing the resulting 2-(1-formamido)ethyl compound with a reducing agent such as lithium aluminum hydride to form the monomethyl compound.

The synthesis of starting materials for this invention or for the end products known to the art are referred to in one or more of the following:

E. Fourneau et al., J. Pharm. Chim. 18, 185 (1933),
R. Paul et al., Compt. rend. 220, 919 (1945),
Z. M. Bacq et al., Arch. Intern Pharmacodynamie 50, 315 (1935), 52, 471 (1936),
R. Stoermer et al., Ber. 57B, 72 (1924), and French Pat. 1,344,997, Dec. 6, 1963.

The nontoxic acid addition salts of the compounds of Formula I may be prepared by reacting the base with a pharmaceutically acceptable acid which will give the required salt, for example hydrochloric, sulfuric, sulfamic, maleic, ethanedisulfonic acids.

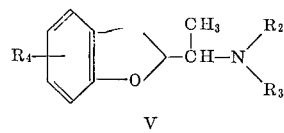

V in which $R_2$–$R_4$ are as described above.

In formulating the pharmaceutical compositions of the invention which have antidepressant activity, the pharmacologically active compound of Formula V or a pharmaceutically acceptable acid addition salt thereof is associated with a pharmaceutically acceptable carrier in dosage unit firm. The carrier may be merely an orally ingestible container for the active ingredient, for example a gelatin capsule, but whether or not such a carrier is employed, the active ingredient will generally be in admixture with a carrier which is a pharmaceutically acceptable diluent or excipient of the kind normally used in the production of medicines ready for use. Examples of such carrier are terra alba, maize starch, gelatin, talcum, lactose, magnesium stearate or time delay carriers such as glyceryl distearate, hydrogenated castor wax and others. The compositions will generally be made up in a form suitable for oral administration, for example as a solution, suspension, elixir, packaged powder, capsule, cachet, pill tablet or lozenge. However the composition may alternatively be made up as a suppository or in a form suitable for parenteral administration, for example as a sterile isotonic solution packaged in an ampoule. Advantageously the compositions are made up in a dosage unit form suitable for the desired mode of administration, the amount of active ingredient in each dosage unit being such that one or more units are required for each therapeutic administration. The total daily dosage of the active ingredient which may be administered may be from about 5 to about 50 mg. per day for an average 75 kg. subject. The dosage units will run from about 1–50 mg. as is convenient.

It will be appreciated that in the case of the known coumaran derivatives falling within the definition of Formula I, the compositions of the invention do not include mere solutions of the active compound in water or a common non-toxic organic solvent except when such solutions have been made up in a manner such as to be specifically capable of use for therapeutic purposes as for sterile injectable preparations.

The compounds of Formula V are not known to have any therapeutic activity suggested for them in the prior art. Indeed all of these compounds with the exception of the compound in which $R_2$–$R_4$ are hydrogen are believed new compounds. The presence of the $R_1$ methyl group yields compounds which are many fold more active in antidepressant tests than are the $R_1$ hydrogen compounds.

According to another aspect of this invention, the compounds of Formula I are administered internally either orally or parenterally to abnormal animal hosts to either induce antidepressant activity in a depressed subject or to prevent depression in a potentially depressed subject. The compounds are administered in effective but nontoxic quantities most often by means of the type of pharmaceutical dosage unit forms described above. The amounts may vary according to the body weight of the subject, the potency of the compound or the severity of the depression but an average daily dosage regimen is from about 5–50 mg. per day for an average host as noted hereabove. Activity has been demonstrated at doses over a range of 0.625 to 200 mg./kg. orally.

As an example of the utility of the claimed invention the folowing results were obtained using the ptosis reveral or prevention method described in Experientia 16, 461 (1960) and Fed. Proc. 19, 268 (1960). In the following tests the hydrochlorides of the compounds were administered orally with controls as described in the reported test procedures. The following summarizes these results.

PREVENTION OF RESERPINE-INDUCED PTOSIS (IN RAT)

| Compound of Formula I | Dose, mg./kg. | Percent protection at 1 hr. | Reversal percent ptosis at 1 hr. |
|---|---|---|---|
| $R_1=R_4=H$, $R_2=R_3=Me$ | 100 | | |
|  | 50 | 45 | |
|  | 12.5 | 0 | |
| $R_1=R_2=R_4=H$; $R_3=Me$ | 50 | 85 | |
|  | 12.5 | 60 | |
| $R_1=R_2=R_3=Me$; $R_4=H$ | 100 | | 75 |
|  | 50 | | 65 |
|  | 25 | 66 | 100 |
|  | 12.5 | | 40 |
| $R_1=R_3=Me$; $R_2=R_4=H$ | 100 | 100 | |
|  | 25 | 100 | 90 |
|  | 10 | 80 | 60 |
|  | 6.25 | | 70 |
|  | 2.5 | 45 | 90 |
| $R_1=Me$; $R_2=R_3=R_4=H$ | 10 | 100 | 10 |
|  | 5 | | 40[1] |
|  | 2.5 | 100 | 90[2], 30 |
|  | 1.25 | | 100[1] |
|  | 0.625 | | 20[2] |
| $R_1=R_2=R_3=R_4=Me$ | 200 | 60, 40[3] | 50, 50[3] |
|  | 50 | 20, 20[3] | 90, 100[3] |
| $R_2=H$; $R_1=R_3=R_4=Me$ | 200 | 100 | |
|  | 50 | 100 | |
|  | 25 | | 100, 5 |
|  | 12.5 | 70 | 90, 65 |
|  | 6.25 | 40 | |
|  | 3.125 | 10 | |

[1] 100% at 3 hrs.
[2] 10% at 3 hrs.
[3] at 3 hrs.

Several of these compositions also have demonstrated activity in the standard picrotoxin potentiation test which is indicative of antidepressant activity. In a dose range test in mice amounts of 2-(1-dimethylaminoethyl)coumarin hydrochloride ranging from 12.5 to 400 mg./kg. demonstrate gross effects indicative of antidepressant activity with some toxic effects apparent at the 400 mg./kg. level.

The preferred compounds in which $R_1$ is lower alkyl preferably methyl can of course exist in stereoisomeric forms. Either separated isomers or mixtures thereof are included in this invention.

EXAMPLE 1

2-bromomethylcoumaran (5.72 g.) and an ethanolic solution of dimethylamine (20 ml. of a 33% w./w. solution) are heated in a bomb for 30 hours at 85–120° C. The resulting cold mixture is treated with water (150 ml.), extracted with ether and the extract washed with 10% aqueous sodium chloride. The required product is extracted by dilute hydrochloric acid, liberated by the addition of 50% w./v. aqueous sodium hydroxide and re-extracted into ether. After drying over anhydrous sodium sulfate the ethereal solution is evaporated and finally distiled to give 2-dimethylaminomethylcoumaran which is converted into its hydrochloride salt by the addition of ethanolic hydrogen chloride followed by ether. When recrystallized from ethanol/ether the salt has a M.P. of 192–193.5° C.

This reaction is repeated using an excess of pyrrolidine to give 2-pyrrolidinylmethylcoumaran adn its sulfate salt. This is filled into a capsule and used as described hereafter.

EXAMPLE 2

2-bromomethylcoumaran (5.1 g.) and an ethanolic solution of methylamine (20 ml. of a 33% w./w. solution) are reacted in a manner similar to that described in Example 1 to give 2-methylaminomethyl)coumaran which is converted into a crystalline hydrochloride having a M.P. of 209–211° C. and used as described hereafter.

EXAMPLE 3

Coumaran-2-carboxylic acid is converted into the acid chloride by refluxing with thionyl chloride, the product on distillation having a B.P. of 152–158° C./22 mm. Hg. This acid chloride (91 g.) dissolved in ether (100 ml.) is added to a solution of diethylethoxymagnesiomalonate (prepared from 14.6 g. of magnesium by the method of Walker & Hauser described in J.A.C.S. 68, 1386 (1946) in ether (200 ml.). The mixture is refluxed for 30 minutes, cooled and acidified with hydrochloric acid. The resulting ether layer is separated and the aqueous layer extracted with more ether. The combined ether extracts are evaporated to small volume on the water bath and the residual material heated under reflux for four hours with a mixture of acetic acid (200 ml.), water (150 ml.) and sulfuric acid (25 ml.). The reaction mixture is then basified and extracted with ether. Evaporation of the ethereal solution followed by distillation gives 2-acetylcoumaran as a colorless liquid, B.P. 85–88° C./1.5 mm. Hg. (Yield 58.5 g.; 72%.)

The 2-acetylcoumaran (30 g.) is heated under reflux with hydroxylamine hydrochloride (12.6 g.), sodium acetate (53 g.) and aqueous ethanol (300 ml.) to give a crystalline oxime, M.P. 109–110.5° C. (Yield 27 g.; 83%).

The oxime (20.2 g.) is reduced by heating under reflux with lithium aluminum hydride (7.1 g.) in ether (500 ml.) for 30 minutes. After treatment with saturated sodium sulfate, the 2-(1-aminoethyl)coumaran so formed is isolated from the reaction mixture as a colorless liquid, B.P. 96–100° C./0.7 mm. Hg. (Yield 16.4 g.; 89%.) The base is converted to a crystalline hydrochloride having, when recrystallized from ethanol/ether, a M.P. of 178–180° C.

EXAMPLE 4

2-(1 - aminoethyl)coumaran (8.0 g.), formaldehyde (9.6 ml. of a 40% w./v. aqueous solution) and formic acid (11.2 ml.) are heated on a steam bath for 12 hours.

The resulting 2-(1-dimethylaminoethyl)coumaran is extracted from the reaction mixture by conventional procedures and is directly converted into its hydrochloride salt which, when recrystallized from ethanol/ether, forms white crystals having a M.P. of 212–213° C.

EXAMPLE 5

2-acetylcoumaran (24.2 g.) is heated under reflux with formic acid (21 g.) and formamide (22 g.) for four hours. The resulting 2-(1-formamidoethyl)coumaran is isolated by addition of water to the reaction mixture, extraction with benzene and distillation of the benzene extract. The product is a colorless liquid having a B.P. of 162–164° C./1.0 mm. Hg. (Yield 15.2 g.; 53%.)

The formamide (8.0 g.) prepared in the foregoing manner is reduced by refluxing with lithium aluminum hydride (2.4 g.) in tetrahydrofuran (100 ml.) for 20 hours. The resulting 2-(1-methylaminoethyl)coumaran is isolated from the reaction mixture by conventional procedures and directly converted into its hydrochloride salt which crystallizes as a white solid from ethanol/ether having a M.P. of 220–224° C.

EXAMPLE 6

8-methylcoumarin (138 g.) in chloroform (200 ml.) is treated dropwise with bromine (160 g.) in chloroform (83 ml.) over 4 hours. Excess of bromine is then removed by treatment with 20% sodium sulfate solution. The chloroform layer is dried over sodium sulfate and concentrated to yield 3:4-dibromo-8-methylcoumarin as a yellow solid M.P. 93° C. (213 g.).

This compound is added to a stirred solution of potassium hydroxide (450 g.) in 90% aqueous ethanol (700 ml.) while the temperature is maintained at 20° C. The solution is then refluxed for 2 hours. After diluting the solution with water (2.5 l.) it is steam distilled until 3.5 l. of distillate has been collected. Acidification of the residue gives a solid which is collected and recrystallized from ethanol, this solid being 7 - methylbenzofuran-2-carboxylic acid, M.P. 218–219° C. (Yield 124 g. 81%.)

5% sodium amalgam (1 kg.) is added in small portions to a hot stirred suspension of the foregoing acid (123 g.) and potassium hydroxide (49 g.) in water (630 ml.). When the addition is complete, the clear solution is decanted from the mercury and acidified with dilute hydrochloric acid. The resulting white solid is collected, washed with water and crystallized from aqueous ethanol to give 7-methylcoumaran - 2 - carboxylic acid, M.P. 123° C. (Yield 118 g.; 94%.) When crystallized twice more from aqueous ethanol, the acid has a M.P. of 139–140.5° C.

The 7-methylcoumaran-2-carboxylic acid is then converted into its acid chloride, B.P. 112–114° C./15 mm., in 81% yield by refluxing with thionyl chloride.

The resulting acid chloride (103 g.) is allowed to react with diethylethoxymagnesiomalonate as described in the foregoing Example 3 to form 2-acetyl-7-methylcoumaran as a colorless liquid, B.P. 84–86° C./0.3 mm. (Yield 55.6 g.; 54%.)

This compound (40 g.) is heated under reflux with hydroxylamine hydrochloride (18.9 g.), sodium acetate (79 g.) and aqueous ethanol (450 ml.) to give the corresponding crystalline oxime, M.P. 90–90.5° C. (Yield 34 g.; 80%.)

This oxime (33.3 g.) is reduced by heating under reflux with lithium aluminum hydride (14.2 g.) in ether for 24 hours. The resulting 2-(1-aminoethyl)-7-methylcoumaran is a colorless liquid, B.P. 94–96° C./0.2 mm. (Yield 21.7 g.; 70%.) The base forms a crystalline hydrochloride, M.P. 277° C.

The 2 - (1-aminoethyl)-7-methylcoumaran (10 g.) is treated in the manner described in Example 4 with formaldehyde (12 ml. of 40% w./v. aqueous solution) and formic acid (14 ml.) to form 2-(1-dimethylaminoethyl)-7-methylcoumaran, which has a B.P. of 90–92° C./0.2 mm. (Yield 9.3 g.; 80%.) This base forms a crystalline hydrochloride, M.P. 191–193° C.

EXAMPLE 7

2-acetyl-7-methylcoumaran (15.5 g.) prepared in the manner described in Example 6, formic acid (13 ml.), and formamide (12.5 ml.) are heated under reflux for 16 hours. The resulting 2-(1-formamidoethyl)-7-methylcoumaran, isolated by the method described in Example 5, is a syrup (yield 12.5 g.; 69%) which is reduced in the manner described in Example 5 to give 2-(1-methylaminoethyl)-7 - methylcoumaran as a colorless liquid, B.P. 119–123° C./0.2 mm. (Yield 8.0 g.; 69%.) The base forms a crystalline hydrochloride, M.P. 168–170° C.

EXAMPLE 8

5-chloro-2-bromomethylcoumaran (10 g., prepared as in South African patent 62/4,230) is reacted with an excess of N-methylpiperazine as in Example 1 to give 5-chloro-2-(N-methylpiperazinylmethyl)-coumaran.

6-trifluoromethyl-2-bromomethylcoumaran (5 g., South African Patent 62/4,230) is reacted with N-hydroxyethylpiperazine to give 6-trifluoromethyl-2-N-hydroxyethylpiperazinylmethyl)-coumaran.

6-fluoro-2-bromomethylcoumaran (5 g., South African patent 62/4,230) is reacted with propylamine to give 6-fluoro-2-(propylaminomethyl)-coumaran.

All these are placed in dosage unit form and used as described hereafter.

EXAMPLE 9

Capsules containing the following ingredients were prepared in accordance with known pharmaceutical techniques:

| Ingredient: | Mg. per capsule |
|---|---|
| 2 - (methylaminomethyl)coumaran hydrochloride | 5 |
| Lactose | 293 |
| Magnesium stearate | 2 |

The finely powdered ingredients were mixed and filled into No. 2 hard gelatin capsules. The capsules are administered 5 times daily to a depressed subject.

EXAMPLE 10

Capsules containing the following ingredients were prepared in accordance with known pharmaceutical techniques:

| Ingredient: | Mg. per capsule |
|---|---|
| 2 - (1 - methylaminoethyl)coumaran hydrochloride | 10 |
| Lactose | 288 |
| Magnesium stearate | 2 |

The finely powdered ingredients were mixed and filled into No. 2 hard gelatin capsules. The capsules are administered 3 times daily to a potentially depressed subject.

EXAMPLE 11

Capsules containing the following ingredients were prepared in accordance with known pharmaceutical techniques:

| Ingredient: | Mg. per capsule |
|---|---|
| 2 - (1 - dimethylaminoethyl)-coumaran hydrochloride | 25 |
| Lactose | 272 |
| Magnesium stearate | 3 |

The finely powdered ingredients were mixed and filled into No. 2 hard gelatin capsules which are administered twice daily.

EXAMPLE 12

Tablets were prepared by granulating, mixing and compressing in accordance with known pharmaceutical techniques the following ingredients:

| Ingredient: | Mg. per capsule |
|---|---|
| 2-(1-aminoethyl)coumaran hydrochloride | 25 |
| Terra alba | 275 |
| Maize starch | 18 |
| Icing sugar | 11 |
| Gelatin (as 5% w./v. solution) | 4 |
| Talcum | 4 |
| Magnesium stearate | 2 |

The tablets were scored so as to allow one half or quarter thereof to be administered orally to depressed subjects.

EXAMPLE 13

A solution suitable for parenteral administration was prepared from the following ingredients:

| | G. |
|---|---|
| 2-(1-methylaminoethyl) - 7 - methylcoumaran hydrochloride | 2.5 |
| Sodium chloride | 0.5 |
| Pyrogen free distilled water, q.s. to 100 ml. | |

The hydrochloride salt was dissolved under aseptic conditions in the pyrogen free distilled water. The sodium chloride was then added to render the solution substantially isotonic. The solution so formed was then filled into ampules having a nominal 2 ml. capacity in an amount of 2.2 ml. per ampule. The ampules were then sealed and sterilized by heating in an autoclave at 115° C. for 30 minutes.

EXAMPLE 14

7-methoxy-2(1-piperidylmethyl) - coumaran sulfate 10 mg. [Arch. Intern. Pharmacodynamie, 52, 471(1936)] is mixed with lactose, filled into a capsule and administered orally three times daily.

2 - (1 - morpholinomethyl)coumaran hydrochloride 15 mg. [C.A., 55, 27254] is mixed with lactose, filled into a capsule and administered orally.

7-methoxy-2-(diethylaminomethyl) - coumaran sulfate, 20 mg., [Arch. Intern. Pharmacodynamie, 50, 315(1935)] is mixed with lactose, filled into a capsule and administered orally.

6-ethoxy-2 - (methylaminomethyl) - coumaran [Arch. Intern. Pharmacodynamie, 50, 315(1935)], 15 mg., is filled into a capsule with lactose, then administered orally three times daily.

What is claimed is:
1. The method of producing antidepressant activity in a depressed host animal comprising administering internally an effective but nontoxic quantity of a base or its nontoxic salt with a pharmaceutically acceptable acid, said base having the structure:

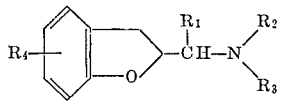

in which $R_1$ is hydrogen or lower alkyl; $R_2$ and $R_3$ are each hydrogen, lower alkyl or, when taken together with the nitrogen atom, piperidyl, pyrrolidinyl, morpholinyl, N-hydroxyethylpiperazinyl or N-lower alkyl piperazinyl; and $R_4$ is hydrogen, lower alkyl, lower alkoxy, trifluoromethyl or halo.

2. The method of claim 1 in which $R_1$ is methyl.
3. The method of claim 1 in which $R_1$ is methyl, $R_4$ is hydrogen and $R_2$ and $R_3$ are each hydrogen or methyl.

4. The method of claim 1 in which the administration is orally and $R_1$ is methyl, $R_4$ is hydrogen and $R_2$ and $R_3$ are methyl.
5. The method of claim 1 in which the administration is orally and $RR_1$ and $R_4$ are methyl and $R_2$ and $R_3$ are hydrogen or methyl.
6. A pharmaceutical composition in dosage unit form for producing antidepressant activity comprising a dosage unit form containing an effective but nontoxic quantity of a base or its nontoxic salt with a pharmaceutically acceptable acid, said base having the structure:

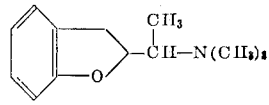

and a pharmaceutically acceptable carrier therefor.

7. A pharmaceutical composition in dosage unit form for producing antidepressant activity comprising a dosage unit form containing an effective but nontoxic quantity of a base or its nontoxic salt with a pharmaceutically acceptable acid, said base having the structure:

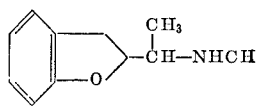

and a pharmaceutically acceptable carrier therefor.

8. A pharmaceutical composition in dosage unit form for producing antidepressant activity comprising a dosage unit form containing an effective but nontoxic quantity of a base or its nontoxic salt with a pharmaceutically acceptable acid, said base having the structure:

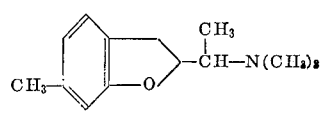

and a pharmaceutically acceptable carrier therefor.

9. A pharmaceutical composition in dosage unit form for producing antidepressant activity comprising a dosage unit form containing an effective but nontoxic quantity of a base or its nontoxic salt with a pharmaceutically acceptable acid, said base having the structure:

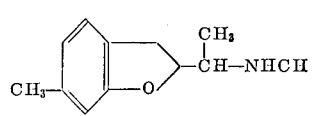

and a pharmaceutically acceptable carrier therefor.

References Cited

UNITED STATES PATENTS 3,156,688  11/1964  Zaugy et al. _____ 424—285
3,226,402  12/1965  Schoetensack _____ 424—285

OTHER REFERENCES

E. Fourneau et al.: J. Pharm. Chim. 18, pp. 185–191 (1933).
Chem. Abst. 30, pp. 6450–6451 (1936).

ALBERT T. MEYERS, Primary Examiner
S. J. FRIEDMAN, Assistant Examiner

U.S. Cl. X.R.
260—346.2; 424—248, 250, 267, 274